United States Patent [19]

Dellar et al.

[11] Patent Number: 4,918,122
[45] Date of Patent: Apr. 17, 1990

[54] FLAME RETARDANT COMPOSITIONS

[75] Inventors: Richard J. Dellar, Timperley; Norman Richardson, deceased, late of Middleton, by Joyce Richardson, heir; Brian G. Clubley, Wilmslow, all of England

[73] Assignee: Ciba-Geigy Corporation, Ardsley, N.Y.

[21] Appl. No.: 73,787

[22] Filed: Jul. 15, 1987

[30] Foreign Application Priority Data

Jul. 22, 1986 [GB] United Kingdom ............... 8617861

[51] Int. Cl.$^4$ ............................................. C08K 5/34
[52] U.S. Cl. ....................................... 524/95; 524/96; 524/97; 524/98; 524/99; 524/100; 524/103; 524/131
[58] Field of Search ...................... 524/95, 96, 97, 98, 524/99, 100, 103, 131

[56] References Cited

U.S. PATENT DOCUMENTS 3,935,162 1/1976 Goldburn et al. ............... 524/131
4,666,967 5/1976 Richardson et al. ............ 524/131

Primary Examiner—John Kight
Assistant Examiner—Kriellion S. Morgan
Attorney, Agent, or Firm—Stephen V. O'Brien; Harry Falber

[57] ABSTRACT

The invention provides a composition comprising a resin processable at temperatures upto 160° C. having incorporated therein a flame retardant amount of a salt formed by reaction between dimethyl methyl phosphonate, monomethyl methyl phosphonate or methyl phosphonic acid, and a compound of the general formula (I)

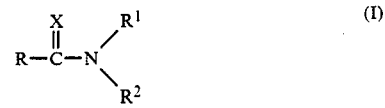

in which X is O or S; $R^1$ is H, alkyl with 1 to 4 carbon atoms, alkenyl of up to 4 carbon atoms, CN, $CONH_2$ or $NH_2$, $R^2$ is H, alkyl with 1 to 4 carbon atoms or alkenyl of up to 4 carbon atoms or $R^1$ and $R^2$ together with the nitrogen atom to which they are attached form a heterocyclic ring of up to 6 carbon atoms which may optionally contain another hetero atom and R is H, an alkyl group with 1 to 8 carbon atoms, an aryl group with 6 to 10 carbon atoms, a cycloalkyl group with 5 to 12 carbon atoms or a heterocyclic group with up to 9 ring carbon atoms, or, together with $R^1$ forms an alkylene chain of 3 to 10 carbon atoms, or R is a group $NHR^3$ wherein $R^3$ is H, alkyl with 1 to 4 carbon atoms, alkenyl of up to 4 carbon atoms, CN, $CONH_2$ or $NH_2$ or together with $R^1$ forms an alkylene chain of 2 or 3 carbon atoms, or R is a group.

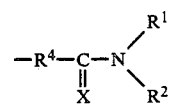

where $R^1$ and $R^2$ are as defined above and $R^4$ is direct bond or an alkylene group having up to 8 carbon atoms or is an arylene group having 6 to 10 carbon atoms.

12 Claims, No Drawings

FLAME RETARDANT COMPOSITIONS

The present invention relates to the use of organic salts of phosphonic acids in rendering resins processable at temperatures upto 160° C. and more flame retardant.

Accordingly the present invention provides a resin processable at temperatures upto 160° C. having incorporated therein a flame retardant amount of a salt formed by reaction between dimethyl methyl phosphonate, monomethyl methyl phosphonate or methyl phosphonic acid, and a compound of the general formula I

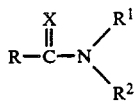
(I)

in which X is O or S; $R^1$ is H, alkyl with 1 to 4 carbon atoms, alkenyl of up to 4 carbon atoms, CN, $CONH_2$ or $NH_2$, $R^2$ is H, alkyl with 1 to 4 carbon atoms or alkenyl of up to 4 carbon atoms or $R^1$ and $R^2$ together with the nitrogen atom to which they are attached form a heterocyclic ring of up to 6 carbon atoms which may optionally contain another hetero atom and R is H, an alkyl group with 1 to 8 carbon atoms, an aryl group with 6 to 10 carbon atoms, a cycloalkyl group with 5 to 12 carbon atoms or a heterocyclic group with up to 9 ring carbon atoms, or, together with $R^1$ forms an alkylene chain of 3 to 10 carbon atoms, or R is a group $NHR^3$ wherein $R^3$ is H, alkyl with 1 to 4 carbon atoms, alkenyl of up to 4 carbon atoms, CN, $CONH_2$ or $NH_2$ or together with $R^1$ forms an alkylene chain of 2 or 3 carbon atoms, or R is a group.

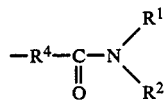

where $R^1$, $R^2$ and X are as defined above and $R^4$ is a direct bond or an alkylene group having up to 8 carbon atoms or is an arylene group having 6 to 10 carbon atoms.

Various compounds of formula (I) may be used. One suitable and preferred class of compounds has the general formula (II)

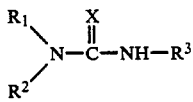
II where $R^1$, $R^2$, $R^3$ and X are as defined above.

Another suitable class of compounds has the general formula (III)

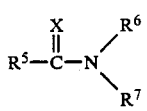
III where $R^5$ is H, alkyl with 1 to 8 carbon atoms, an aryl, cycloalkyl or heterocyclic group; and $R^6$ and $R^7$ are the same or different and are H or an alkyl group with 1 to 4 carbon atoms, or $R^6$ and $R^7$ together with the nitrogen atom to which they are attached form a heterocyclic ring of up to 6 carbon atoms which may optionally contain another hetero atom, and X is as defined above.

Another suitable class of compounds has the general formula (IV)

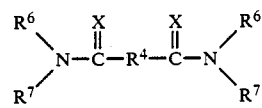
IV where $R^4$, $R^6$ and $R^7$ are as defined above.

Another suitable class of compounds has the general formula (V)

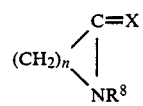
V where $R^8$ is H or alkyl having 1 to 4 carbon atoms and n is an integer from 3 to 10, and X is as defined above.

When R or $R^5$ is a $C_1$-$C_8$ alkyl group it may be, for example, methyl, ethyl, isopropyl, n-butyl, sec-butyl, hexyl or octyl.

When $R^1$, $R^2$, $R^3$, $R^6$, $R^7$ or $R^8$ is a $C_1$-$C_4$ allyl group it may be, for instance, methyl, ethyl, isopropyl, n-butyl or sec-butyl.

When $R^1$, $R^2$ or $R^3$ is alkenyl with up to 4 carbon atoms it may be, for instance, alkyl, propenyl or butenyl.

When $R^1$ and $R^2$ or $R^6$ and $R^7$ form a heterocyclic group, it maay be, for instance, a pyridine, morpholine, piperidine, or piperazine ring.

When R is a heterocylic ring with up to 9 carbon atoms it may be, for instance, a pyridine, morpholine, piperidine, indole or quinoline ring.

When R is an aryl ring with 6–10 carbon atoms it may be, for instance a benzene or naphthalene ring.

When R is a cycloalkyl ring with 5–12 carbon atoms it may be, for instance a cyclopentyl, cyclohexyl, cyclooctyl or cyclododecyl ring.

When $R^5$ is an aryl, cycloalkyl or heterocyclic group, it may be a radical such as those described above for R.

When R and $R^1$ together form aan alkylene chain of 3 to 10 carbon atoms it may be, for instance, propylene, butylene, hexylene or decamethylene.

When $R^4$ is an alkylene group having up to 8 carbon atoms it may be, for instance, methylene, ethylene, propylene, hexylene or octylene.

When $R^4$ is an arylene group having 6 to 10 carbon atoms it may be, for instance, phenylene or naphthylene.

The salts used in the present invention may be prepared by mixing dimethyl methyl phosphonate, monomethyl methyl phosphonate or methyl phosphonic acid with a compound of the general formula (I), defined above, optionally in an aqueous or organic solvent and optionally under an inert gas atmosphere, and heating if necessary to cause the salt to form.

The amount of dimethyl methyl phosphonate, monomethyl methyl phosphonate or methyl phosphonic acid is that which will react with one or more salt forming nitrogen atoms in the compound of formula (I) to give a mono-salt, di-salt or higher salt as desired. Usually a mono-salt or di-salt is prepared which will need one or two moles of phosphonic acid or ester per mole of compound of formula I.

If methyl phosphonic acid or its monomethyl ester is used, formation of the salt is rapid and mild conditions may be used. The acid and compound of formula (I) may be simply mixed at room temperature to form the salt. If the compound of formula (I) is a viscous liquid or a solid, the mixture may be heated, e.g. up to 100° C. to ensure efficient reaction. If desired an aqueous or organic solvent may be used and is removed at the end of the reaction.

If DMMP is used, more vigorous reaction conditions are needed to ensure salt formation. The reaction mixture may be heated up to 180° C., optionally under an inert gas such as nitrogen. Heating at 100° C. to 180° C. for several hours may be needed. If desired the reaction may be performed in an aqueous or organic solvent, for example a hydrocarbon solvent such as toluene or xylene.

Methyl phosphonic acid and its esters and the compounds of formula (I) are all known compounds and can be prepared in various ways.

Examples of compounds of formula (I) which may be used to form salts include urea, thiourea, N-methyl urea, N-allyl urea, N,N-diallyl urea, N,N¹-dimethyl urea, ethylene urea, biuret, (thio)acetamide, (thio)propionamide, (thio)butyramide, (thio)octanamide, malonamide, mono- or di-thio malonamide, succinamide, mono- or di-thio succinamide, sebacamide, pyrrolidonone, piperidinone, (thio)caprolactam and (thio)dodecalactam.

The salts used in the invention may be used alone or together with other flame retardants such as those given below for imparting flame retardance to resins.

The salts used in the invention may be incorporated into the resin by adding to the reaction mixture used to prepare resin.

The amount of flame retardant salt which may be incorporated in the resin depends on the level of flame retardancy required. Typically the amount of flame retardant salt may be from 1 to 100 parts, preferably 3 to 50 parts by weight per hundered parts by weight of resin.

Any resin which can be processed at temperatures upto 160° C. may be used, including resins which are cold cured.

Suitable resins include epoxy resins such as a phenol formaldehyde novolak cured epoxide, phenol-formaldehyde resins which may be foamed, and including ester cured alkaline phenolformaldehyde resins, urea-formaldehyde resins, unsaturated polyester resins and also paints such as polyvinyl acetate latex paints. Articles made from or incorporating the resins are also suitable for use with the flame retardant salts such as chipboard, e.g. urea-formaldehyde bound chipboard.

The salts may be mixed with other flame retardant compounds. These may be, for example, halogen-containing compounds such as aliphatic and aromatic bromine compounds, oxyalkylated phosphate esters, chloroalkyl phosphates, phosphonates or tri-aryl phosphates. Examples of suitable compounds are pentabromodiphenyl ether, dibromocresyl glycidyl ether, tetra-bromo bisphenol A, dibromoneopentyl glycol, a diol produced by the reaction of tetrabromomophthalic anhydride with ethylene oxide and/or propylene oxide, tris(chloroethyl)phosphate, tris(monochloropropyl)phosphate, diethyl bis(hydroxyethyl)aminomethyl phosphonate, and isopropylated or t-butylated phenyl phosphate mixtures as described in British Patent Specification No. 1146173, tricresyl phosphate, trixylyl phosphate and cresyl diphenyl phosphate.

The salts of the invention may also be used in admixture with amine salts of phosphonic acids of the general formula (VI) and/or (VII);

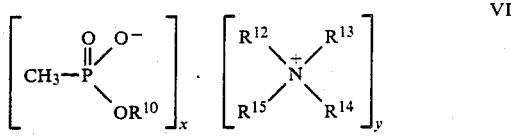

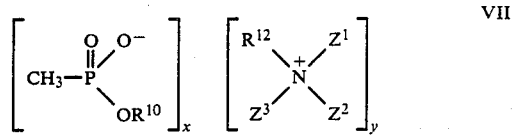

wherein x and y are integers such that the number of negative and positive charges are the same, wherein $R^{12}$ is hydrogen or methyl, $R^{13}$ is a $C_2$-$C_4$ alkyl group substituted by 1-3 hydroxyl groups, which may be substituted by an oxyalkylene chain, there being not more than one hydroxyl group on any one carbon atom, $R^{14}$ and $R^{15}$ may be the same or different and may be a group as defined for $R^{13}$, or hydrogen, a $C_1$-$C_4$ alkyl group, a phenyl group, a benzyl group, or a phenyl or benzyl group substituted on the aromatic ring by an alkyl group of 1-12 carbon atoms, a hydroxyl group, which may be substituted by an oxyalkylene chain, and/or 1-3 halogen atoms, or $R^{15}$ is a group of the formula (VIII),

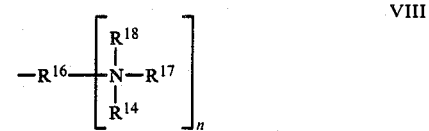

wherein $R^{16}$ is an alkylene group of 2-4 carbon atoms, a phenylene group, a xylylene group, a diphenyl methane group or is a group of the formula

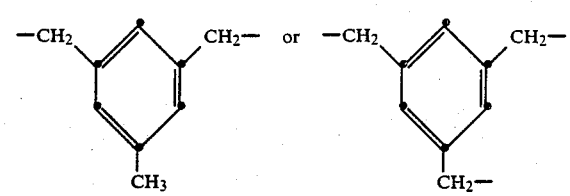

in which aromatic rings in a group $R^{16}$ may be substituted by an alkyl group of 1-12 carbon atoms, a hydroxyl group, which may be substituted by an oxyalkylene chain, and/or 1-3 halogen atoms, and $R^{17}$ is hydrogen or methyl, in which cases the nitrogen atom carries a positive charge, or $R^{17}$ is absent; $R^{18}$ is hydrogen or a group as defined for $R^{13}$ and n is 1 or 2;

or $R^{14}$ and $R^{15}$ may be joined to form, with the nitrogen, 5 or 6 membered heterocyclic ring, optionally containing an oxygen atom; and $Z^1$, $Z^2$ and $Z^3$ are the same or different and represent hydrogen, a $C_1$-$C_{12}$ straight or branched chain alkyl group, a $C_3$-$C_{12}$ straight or branched chain alkynyl group, a $C_4$-$C_{12}$ cycloalkyl group, a phenyl or naphthyl group which may be substituted by a $C_1$-$C_4$ straight or branched chain alkyl group, a $C_1$–$C_4$ alkoxy group, amino, methylamino, halogen or nitro, or a $C_7$–$C_{12}$ aralkyl group;

or $Z^2$ and $Z^3$ together with the nitrogen atom to which they are attached form a saturated or unsaturated 3–7 membered ring system which may optionally contain another hetero atom, and the ring system is optionally substituted by a $C_1$–$C_4$ straight or branched chain alkyl group, a $C_1$–$C_4$ alkoxy group, amino, methylamino, a $C_1$–$C_4$ aminoalkyl group, halogen or nitro;

or $Z^1$, $Z^2$ and $Z^3$ together with the nitrogen atom to which they are attached form an 8–12 membered bicyclic ring optionally containing another hetero atom, or $Z^1$ is a group of the formula

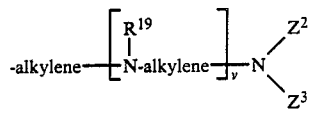

wherein alkylene is a group containing 2 to 12 carbon atoms, v is 0 or an integer from 1 to 5, $R^{19}$ is hydrogen or a $C_1$–$C_{16}$ straight or branched chain alkyl group, and $Z^2$ and $Z^3$ are as defined above;

or $Z^1$ is a group of the formula

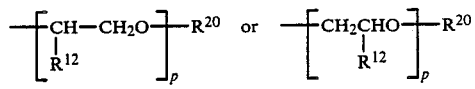

in which $R^{12}$ is as defined above, $R^{20}$ is a $C_1$–$C_{12}$ alkyl group and p is an integer from 1–10, preferably from 1–4;

or $Z^3$ is a group of the formula (VIIIa)

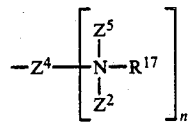

VIIIa wherein $Z^4$ is an alkylene group of 2–12 carbon atoms, a phenylene group, a xylylene group, a diphenyl methane group or a group of the formula

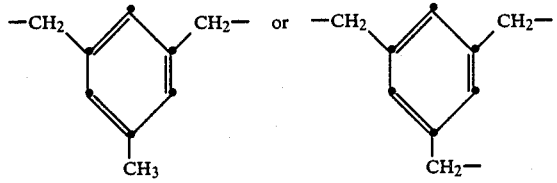

in which aromatic rings in a group $Z^4$ may be substituted by an alkyl group of 1–12 carbon atoms, hydroxyl and/or 1–3 halogen atoms, and $R^{17}$ is hydrogen or methyl, in which cases the nitrogen atom carries a positive charge, or $R^{17}$ is absent; $Z^5$ is hydrogen or a group as defined for $Z^1$ and n is 1 or 2; or $Z^2$ and $Z^5$ may be joined to form, with the nitrogen, a 3 to 7 membered heterocyclic ring, optionally containing another hetero atom.

The salts of formulae (VI) and (VII) may be prepared by mixing methyl phosphonic acid or ester of the formula (IX)

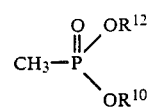

IX wherein $R^{12}$ is as defined above and $R^{10}$ is hydrogen or methyl, with an amine of the formula (X) and/or (XI)

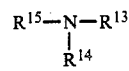

X

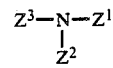

XI wherein $R^{13}$, $R^{14}$, $R^{15}$, $Z^1$, $Z^2$ and $Z^3$ are as defined above, optionally in aqueous or organic solvent and optionally under an inert gas atmosphere, and heating if necessary to cause the salt to form.

The amount of methyl phosphonic acid or ester of formula XI is that which will react with one or more of the amine groups in the amine of formula (X) or (XI) to give a mono-salt, di-salt or higher salt as desired.

The ratio of the salt to other flame retardant compounds may be from 5:95 to 95:5.

The compositions may also contain methyl phosphonic acid and its monomethyl or dimethyl esters which are not reacted with the compound of formula (I) present although, preferably, acidic additives are not present in the formulation.

It is also within the scope of the present invention to employ other materials in the compositions of the present invention where one desires to achieve a particular end result. Such materials include, without limitation, adhesion promotors, antioxidants, antistatic agents, antimicrobials, colourants, heat stabilisers, light stabilisers, pigments, plasticisers, preservatives, ultraviolet stabilisers, and fillers as described in Modern Plastics Encyclopedia, Volume 58, Number 10A, pages 170–187.

The invention is illustrated by the following Examples in which "parts" are parts by weight.

PREPARATION OF UREA/DMMP SALT 600 g (10 mole) urea and 1240 g (10 mole) dimethyl methyl phosphonate are heated for 14 hours at 140° C. under an atmosphere of nitrogen. The reaction mixture is cooled to 50° C. and the apparatus adapted for vacuum distillation. Unreacted started materials are removed by distillation at a pressure of 15.6 mbar up to an internal temperature of 140° C.

There are obtained 1645.8 g of a colourless viscous liquid amide salt, which has the following elemental analysis C, 25.90%; H, 7.13%, N, 15.47% and P, 16.62%. Calculated for $C_4H_{13}N_2O_4P$ C, 26.09%; H, 7.07%; N, 15.22% and P, 16.85%.

EXAMPLE 1

A resole prepared from phenol and formaldehyde in a molar ratio of 1:2, having a solids content of 49.2% and a sodium hydroxide content of 0.42% (38.1 parts) is stirred with a solution of potassium hydroxide (5.95 parts) in water (5.95 parts). The mixture is cooled to 25° C. to give Component A.

Components B, C and D are prepared by dissolving ethylene carbonate, a surfactant (Empimin 3060-Albright & Wilson), diethylene glycol and the urea/DMMP salt described above in water. The formulations are:

|  | B | C | D |
|---|---|---|---|
| Ethylene carbonate | 15 | 15 | 14.6 |
| Empimin 3060 | 1 | 1 | 1 |
| Diethylene glycol | — | 10 | 4.9 |
| Urea/DMMP salt | — | — | 1.2 |
| Water | 34 | 24 | 28.3 |
|  | 50 | 50 | 50 |

Component A (50 parts) is forced through a cylinder containing ballotini to form a stable froth which is then impinged by a spray of Component B (50 parts). The ensuing froth gels in approximately 20 seconds to form a solid foam. The foam is dried at 25° C. to constant weight and then conditioned at 23° C. and 50% relative humidity for 24 hours. The final product is a fine celled foam with a dry density of 82.0 kg/m$^3$. A flame is applied to this foam and the sample is rapidly destroyed by punking.

The above procedure is repeated using Component A and Component C to give a fine celled foam with a dry density of 155.3 kg/m$^3$. A flame is applied to this foam and the sample is rapidly destroyed by punking.

The above procedure is repeated using Component A and Component D to give a fine celled foam with a dry density of 214 kg/m$^3$. A flame is applied to this foam and the sample forms a hard char where the flame impinges. The foam shows no punking at all.

The three products were submitted to the limiting Oxygen Index test and the DIN 4102 B2 test with the following results.

| PF Foam | Oxygen Index % | DIN 4102 B2 | | |
|---|---|---|---|---|
| | | Time to spec. mark (secs) | Max Flame Height (cm) | Burn Time (sec) |
| A + B | <17.9 | — | 4 | 15 |
| A + C | 19.2 | — | 11 | 15 |
| A + D | 20.8 | — | 5 | 15 |

EXAMPLE 2

Wooden chips are dried to a moisture content of 2%. The chips (100 parts) are placed in a Lodige plough shave mixer and tumbled.

Urea formaldehyde resin having a formaldehyde urea mole ratio of 1.25:1 (15.35 parts), urea/DMMP salt described above (10 parts), water (2.94 parts), wax emulsion (Mobil 749, 0.82 parts) and 15% aqueous solution of ammonium chloride (1.0 part) are mixed to give an emulsion.

The emulsion is sprayed onto the wooden chips and the resinated chips are tumbled for 5 minutes. The resinated chips are place in a square wooden frame (internal dimensions 35.5 cm×35.5 cm). The chips are pre-pressed at 8 kg/cm$^2$ for 20 seconds at ambient temperature. The frame is removed from the chips and they are pressed for 15 minutes at 150° C. and 25 kg/cm$^2$ down to 19 mm stops. The board is conditioned for 1 week at 20° C., 65% relative humidity.

When placed in a busen burner flame for 1 minute and removed the flame is extinguished immediately.

COMPARISON

A board is prepared as above but without the urea/DMMP salt. When placed in a bunsen burner flame for 1 minute and removed the board continued to burn.

The two boards wre submitted to the limiting Oxygen Index test and the UL 94 test with the following results.

|  | Oxygen Index % | UL 94 |
|---|---|---|
| Board without urea/DMMP salt | 26.9 | HB |
| Board containing urea/DMMP salt | 40.9 | V-O |

EXAMPLE 3

Polyvinyl acetate latex paint

The urea/DMMP salt described above greatly enhances the formation of the char layer of the following intumescent paint formulation:

| Urea/DMMP salt | 22.9 parts |
|---|---|
| Dipentaerythritol | 3.8 |
| Melamine | 7.7 |
| Melamine/formaldehyde resin | 1.9 |
| Chlorinated paraffin (70% Cl) | 4.6 |
| Coalescing agent | 2.0 |
| Titanium dioxide | 7.7 |
| Polyvinyl acetate resin | 9.5 |
| Water, thickeners | 39.9 |

The paint is coated (twice) onto seasoned pine wood blocks 15 cms×18 mm×18 mms and after drying at 23° C. and 50% relative humidity for 3 days is exposed to a propane flame used in the DIN 4102 B2 test but for an extended period of time. The results are as follows:

|  | ignition time | intumescent char (mm) |
|---|---|---|
| Without urea/DMMP salt | 26 sec | none |
| With ammonium polyphosphate | none during 10 min | slight |
| With urea/DMMP salt | none during 10 min | 5 |

EXAMPLE 4

100 grams of the diglycidyl ether of bisphenol A having an epoxide content of 5.3 mol/kg is mixed at 100° C. with 56 g of a novolak curing agent for the epoxy resin prepared from phenol and formaldehyde with a molar ratio of 1.0:0.56 from which excess phenol is removed. To the hot resin and curing agent mixture is added 20 g of the urea/DMMP salt described above and 0.2 g of 1-methylimidazole as accelerator for the epoxy cure. The resulting mixture is degassed at 100° C. and poured into a suitable casting mould, held at 120° C. for one hour and then heated for an additional 8 hours at 150° C. The cured product is a clear, hard, slightly brittle solid which does not ignite when a flame was applied to it.

The above procedure is repeated except that the formulation does not contain the used DMMP salt. When a flame is applied to it, the cured product ignites and burns with a smokey flame.

The two products were submitted to the limiting Oxygen Index test and the UL 94 test with the following results.

|  | Oxygen Index % | UL 94 |
|---|---|---|
| Product with urea/DMMP salt | 28.3 | V-O |
| Product without urea/DMMP salt | 24.1 | HB |

We claim:
1. A composition comprising an epoxy resin, phenol-formaldehyde resin, urea-formaldehyde resin, unsaturated-polyester resin or polyvinyl acetate latex having incorporated therein an effective flame retardant amount of a salt formed by the reaction between dimethyl methyl phosphonate, monomethyl methyl phosphonate or methyl phosphonic acid and a compound of the general formula (I)

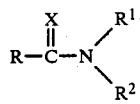
(I)

in which X is O or S; $R^1$ is H, alkyl with 1 to 4 carbon atoms, alkenyl of up to 4 carbon atoms, CN, $CONH_2$ or $NH_2$, $R^2$ is H, alkyl with 1 to 4 carbon atoms or alkenyl of up to 4 carbon atoms or $R^1$ and $R^2$ together with the nitrogen atom to which they are attached form a heterocyclic ring of up to 6 carbon atoms which may optionally contain another nitrogen or an oxygen atom and R is H, an alkyl group with 1 to 8 carbon atoms, an aryl group with 6 to 10 carbon atoms, a cycloalkyl group with 5 to 12 carbon atoms or a heterocyclic group with up to 9 ring carbon atoms selected from the group consisting of pyridine, morpholine, piperidine, indole and quinoline, or, together with $R^1$ forms an alkylene chain of 3 to 10 carbon atoms, or R is a group $NHR^3$ wherein $R^3$ is H, alkyl with 1 to 4 carbon atoms, alkenyl of up to 4 carbon atoms, CN, $CONH_2$, or $NH_2$ together with $R^1$ forms an alkylene chain of 2 or 3 carbon atoms, or R is a group

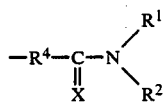

where $R^1$, $R^2$ and X are as defined above and $R^4$ is a direct bond or an alkylene group having up to 8 carbon atoms or is an arylene group having 6 to 10 carbon atoms.

2. A resin composition as claimed in claim 1 in which the compounds of formula I is also of the general formula (II)

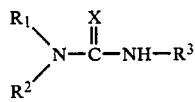
II where $R^1$, $R^2$, $R^3$ and X are as defined in claim 1.

3. A resin composition as claimed in claim 1 in which the compound of formula (I) is also of the general formula (III)

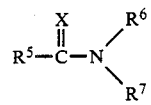
III where $R^5$ is H, alkyl with 1 to 8 carbon atoms, an aryl, cycloalkyl, pyridine, morpholine, piperidine, indole or quinoline group; and $R^6$ and $R^7$ are the same or different and are H or an alkyl group with 1 to 4 carbon atoms, and X is as defined in claim 1.

4. A composition as claimed in claim 1 wherein the compound of formula I is urea.

5. A composition as claimed in any preceding claim which also contains another flame retardant compound selected from aliphatic and aromatic bromine compounds, oxyalkylated phosphate esters, chloroalkyl phosphates, phosphonates or triaryl phosphates.

6. A composition as claimed in any preceding claim which also contains amine salts of phosphonic acids of the general formula VI and/or VII;

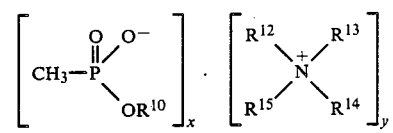
VI

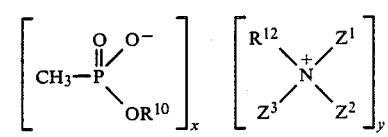
VII wherein x and y are integers such that the number of negative and positive charges are the same, wherein $R^{12}$ is hydrogen or methyl, $R^{13}$ is a $C_2$–$C_4$ alkyl group substituted by 1-3 hydroxyl groups, which may be substituted by an oxyalkylene chain, these being not more than one hydroxyl group on any one carbon atom, $R^{14}$ and $R^{15}$ may be the same or different and may be a group as defined for $R^{13}$, or hydrogen, a $C_1$–$C_4$ alkyl group, a phenyl group, a benzyl group, or a phenyl or benzyl group substituted on the aromatic ring by an alkyl group of 1-12 carbon atoms, a hydroxyl group, which may be substituted by an oxyalkylene chain, and/or 1-3 halogen atoms, or $R^{15}$ is a group of the formula (VIII);

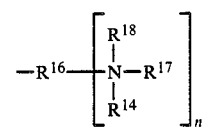
VIII wherein $R^{16}$ is an alkylene group of 2-4 carbon atoms, a phenylene group, a xylylene group, a diphenyl methane group or is a group of the formula

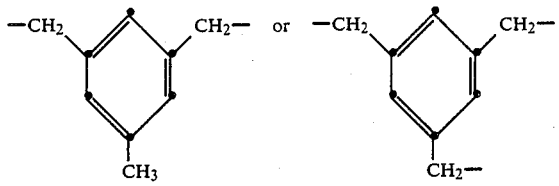

in which aromatic rings in a group $R^{16}$ may be substituted by an alkyl group of 1–12 carbon atoms, a hydroxy group, which may be substituted by an oxyalkylene chain, and/or 1–3 halogen atoms, and $R^{17}$ is hydrogen or methyl, in which cases the nitrogen atom carries a positive charge, or $R^{17}$ is absent; $R^{18}$ is hydrogen or a group as defined for $R^{13}$ and n is 1 or 2;

or $R^{14}$ and $R^{15}$ may be joined to form, with the nitrogen, 5 or 6 membered heterocyclic ring, optionally containing an oxygen atom; and $Z^1$, $Z^2$ and $Z^3$ are the same or different and represent hydrogen, a $C_1$–$C_{12}$ straight or branched chain alkyl group, a $C_3$–$C_{12}$ straight or branched chain alkynyl group, a $C_4$–$C_{12}$ cycloalkyl group, a phenyl or naphthyl group which may be substituted by a $C_1$–$C_4$ straight or branched chain alkyl group a $C_1$–$C_4$ alkoxy group, amino, methylamino, halogen or nitro, or a $C_7$–$C_{12}$ aralkyl group.

7. A composition as claimed in claim 5 in which the ratio of salt as defined in claim 1 to other flame retardant compound is from 5:95 to 95:5.

8. A composition as claimed in claim 1 in which the resin is selected from phenol-formaldehyde novolak cured epoxy resins, ester cured alkaline phenol formaldehyde resins and polyvinyl acetate latex paints.

9. A composition as claimed in claim 1 which comprises an article made from or incorporating the resin.

10. A composition as claimed in claim 9 in which the article is chipboard.

11. A composition as claimed in claim 1 in which the amount of said salt is from 1 to 100 parts by weight per 100 parts by weight of resin.

12. A composition as claimed in claim 11 in which the amount of said salt is from 3 to 50 parts by weight per 100 parts by weight of resin.

* * * * *